US008778851B2

(12) United States Patent
Daccord

(10) Patent No.: US 8,778,851 B2
(45) Date of Patent: Jul. 15, 2014

(54) METHODS FOR TREATING FIBERS

(75) Inventor: Gerard Daccord, Thézan les Béziers (FR)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 13/634,541

(22) PCT Filed: Mar. 17, 2011

(86) PCT No.: PCT/EP2011/054056
§ 371 (c)(1),
(2), (4) Date: Sep. 26, 2012

(87) PCT Pub. No.: WO2011/128172
PCT Pub. Date: Oct. 20, 2011

(65) Prior Publication Data
US 2013/0035265 A1 Feb. 7, 2013

(30) Foreign Application Priority Data
Apr. 12, 2010 (EP) .................................... 10290198

(51) Int. Cl.
*C09K 8/08* (2006.01)
*E21B 33/13* (2006.01)
*C09K 8/035* (2006.01)
*C09K 8/88* (2006.01)
*C09K 8/487* (2006.01)
*C09K 8/68* (2006.01)
*C09K 8/64* (2006.01)
*C09K 8/70* (2006.01)

(52) U.S. Cl.
CPC ................. *E21B 33/13* (2013.01); *C09K 8/035* (2013.01); *C09K 8/88* (2013.01); *C09K 8/487* (2013.01); *C09K 8/68* (2013.01); *C09K 8/64* (2013.01); *C09K 8/70* (2013.01); *C09K 2208/08* (2013.01)
USPC .......................................... 507/119; 507/219

(58) Field of Classification Search
None
See application file for complete search history.

(56) References Cited

U.S. PATENT DOCUMENTS

| 5,399,195 | A | 3/1995 | Hansen et al. | |
|---|---|---|---|---|
| 5,501,275 | A | 3/1996 | Card et al. | |
| 6,562,430 | B1* | 5/2003 | Leon | 428/43 |
| 7,143,827 | B2 | 12/2006 | Chatterji et al. | |
| 2005/0153863 | A1* | 7/2005 | Corominas | 510/446 |
| 2006/0054324 | A1 | 3/2006 | Sullivan et al. | |
| 2006/0070341 | A1 | 4/2006 | Schmidt et al. | |
| 2008/0289828 | A1 | 11/2008 | Hutchins et al. | |

FOREIGN PATENT DOCUMENTS

| EP | 2305450 | 4/2011 |
|---|---|---|
| EP | 2305767 | 4/2011 |
| WO | 00/49211 | 8/2000 |
| WO | 02/48476 | 6/2002 |
| WO | 2006/023698 | 3/2006 |
| WO | 2009/079231 | 6/2009 |

OTHER PUBLICATIONS

Armstrong K. et al.: "Advanced Fracturing Fluids Improve Well Economics," Oilfield Review 7, No. 3 (Autumn 1995): 34-51.
Abbas R. et al.: "A Safety Net for Controlling Lost Circulation," Oilfield Review 15, No. 4 (Winter 2003): 20-27.
Bivins C. et al.: "New Fibers for Hydraulic Fracturing," Oilfield Review 17, No. 2 (Summer 2005): 34-43.
Daccord G. et al.: "Cement-Formation Interactions," in Nelson E.B. and Guillot D. (eds.): Well Cementing—2nd Edition, Houston: Schlumberger (2006): 191-232.
Hubbe, M. A.: "Flocculation and Redispersion of Cellulosic Fiber Suspensions: A Review of Effects of Hydrodynamic Shear and Polyelectrolytes," Review Articles, BioResources 2(2), 296-331 (2007).
Alava, M. and Niskanen, K.: "The Physics of Paper," Rep. Prog. Phys., 69, 669-723 (2006).
Joung, C. G. et al., "Viscosity of Curved Fibers in Suspension," J. Non-Newt Fluid Mech., 102 (1) 1-17 (2002).
N. Low, et al., "Designing Fibered Cement Slurries for Lost Circulation Applications: Case Histories", , Proceedings, SPE Annual Technical Conference and Exhibition—Mile-High Meeting of the Minds: Oct. 5-8, 2003, Denver, Colorado, U.S.A, Richardson, Tex. [U.S.A.] : Society of Petroleum Engineers, US, Oct. 5, 2003, pp. 5603-5610.
Tubbs, R.K., "Polyvinyl Alcohol Acrylate and Methacrylate Copolymers and their Applications in Txtile Sizing and Films", in Polyvinyl Alcohol Developments, Ed., by C.A. Finch, 1992, John Wiley & Sons Ltd.

* cited by examiner

Primary Examiner — Susannah Chung
Assistant Examiner — Kumar R Bhushan
(74) Attorney, Agent, or Firm — Michael Dae

(57) ABSTRACT

Fiber bundles are prepared by affixing at least two fibers with a binding agent. The binding agent is designed such that the fiber bundles remain intact as the fiber bundles are mixed with and suspended in a fluid. After the fiber bundles exit the mixing apparatus, the binding agent degrades and releases the individual fibers. This allows higher concentrations of fibers to be added to fluids without fouling the mixing apparatus.

19 Claims, 1 Drawing Sheet

METHODS FOR TREATING FIBERS

BACKGROUND

The statements in this section merely provide background information related to the present disclosure and may not constitute prior art.

The present disclosure is related in general to fluid compositions and methods for servicing subterranean wells. Particularly, embodiments relate to the use of fluids containing fibers. Such fluids are also referred to as "fiber-laden fluids."

The inclusion of fibers in fluids for servicing subterranean wells has become a well-known practice. For example, fibers are added to drilling fluids to help minimize lost circulation. Similarly, fibers may be added to cement slurries to help minimize lost circulation; fibers can also improve flexural strength of set cement. In hydraulic fracturing operations, fibers may be added to proppant to help prevent proppant flowback as the well produces. Fibers are also used to improve the solids-carrying capacity of fluids as they are pumped downhole for various purposes.

A thorough presentation of the use of fibers in well-service fluids may be found in the following publications.

Armstrong K. et al.: "Advanced Fracturing Fluids Improve Well Economics," *Oilfield Review* 7, no. 3 (Autumn 1995): 34-51.

Abbas R. et al.: "A Safety Net for Controlling Lost Circulation," *Oilfield Review* 15, no. 4 (Winter 2003/2004): 20-27.

Bivins C. et al.: "New Fibers for Hydraulic Fracturing," *Oilfield Review* 17, no. 2 (Summer 2005): 34-43.

Daccord G. et al.: "Cement-Formation Interactions," in Nelson E. B. and Guillot D. (eds.): *Well Cementing—$2^{nd}$ Edition*, Houston: Schlumberger (2006): 191-232.

Many fibers are supplied by manufacturers in the form of packets or "tows." Tows are fiber bundles that are held together by a resin, a surfactant or a crimp. The fibers are aligned, not twisted. Chemical binding agents for this purpose are known in the industry as "sizing," and their compositions are generally proprietary. Tows improve the surface handling of the fibers, preventing premature dispersion. However, upon addition to a liquid, the tows are designed to break apart very quickly into individual fiber strands. An example of fiber packets may be found in WO 00/49211.

During normal wellsite operations, a fiber suspension is prepared by adding the fibers to a fluid in a tank. The mixture is agitated to disperse the fibers and then pumped through a pipe. However, when a large fiber concentration is required, the preparation and pumping of the suspension may become difficult if not impossible due to the inherent property of fibers to form clumps or flocs. The flocs may accumulate on the paddle of the mixer, plug orifices, obstruct pump valves, etc. This imposes a limit on the fiber concentration that can be used during wellsite operations. As a result, the maximum allowable fiber concentration may not be sufficient to attain the optimal fluid properties for the intended application.

Despite many advances made by the well-service industry concerning the delivery and dispersion of fibers, it still would be valuable to provide means to increase the concentration of fibers in wellbore-service fluids, and avoid the negative consequences described above.

SUMMARY

The present embodiments solve the problems mentioned herein.

In an aspect, embodiments relate to methods for dispersing fibers in a fluid.

In another aspect, embodiments relate to methods for preparing bundles of curved fibers.

In yet another aspect, embodiments relate to suspensions comprising a carrier fluid and fibers.

DETAILED DESCRIPTION

Figure 1:
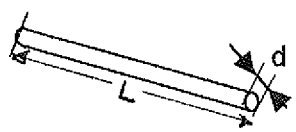
FIG. 1 is an illustration of a fiber with diameter d and length L.

This disclosure provides methods for preparing well-service fluids containing fibers, and compositions comprising fibers and carrier fluids.

The embodiments may be described in terms of treatment of vertical wells, but is equally applicable to wells of any orientation. The embodiments may be described for hydrocarbon production wells, but it is to be understood that the embodiments may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

In the following text, the term "fiber laden" is to be understood, in the context of the present disclosure, as "containing fibers." It is also to be understood that the term linear means "extending along a straight or nearly straight line."

It is known in the art that the behavior of fiber suspensions is a function of the fiber concentration. At low concentrations, the suspension behaves as a dilute fluid. At higher concentrations the suspension behaves like a semi-concentrated fluid. A dilute suspension displays properties slightly different than the base fluid. The particles are independent and do not interact significantly. In the semi-concentrated state, significant interparticle interactions occur that profoundly modify the bulk properties of the suspension.

In the case of fiber suspensions, the semi-concentrated regime is often characterized by the formation of clumps or flocs, and the suspension becomes less homogeneous. The flocs are much larger than the individual fibers from which they are made.

For practical well-service applications, the useful fiber concentrations are often close to or higher than the transition between the dilute and semi-concentrated regimes. One way to quantify the transition between these two regimes is to express fiber concentration in terms of the "crowding factor," defined by the following expression.

$$N_{cr} = \frac{2}{3} C_v \left(\frac{L}{d}\right)^2, \qquad \text{(Eq. 1)}$$

where $N_{cr}$ is the crowding factor, $C_v$ is the fiber-volume concentration, L is the length of the fibers and d is the diameter of the fibers (FIG. 1). The crowding factor is independent of fiber shape. The crowding factor represents the average number of fibers present in a volume equal to that of a sphere with diameter equal to the fiber length. It has been experimentally found that the transition between the dilute and the semi-concentrated regimes occurs at a critical crowding factor of about 60.

In an aspect, embodiments relate to methods that take advantage of the reduced crowding factor offered by the use of fiber bundles. In addition, the fiber bundles are designed such that they do not allow the individual fibers to quickly disperse like conventional tows or packets supplied by fiber manufacturers. Instead, the bundles are designed to flow through and exit a mixing apparatus, maintaining a low crowding factor and preventing the formation of flocs that might foul the mixing apparatus. The method comprises forming fiber bundles by affixing at least two fibers with a binding agent; adding the fiber bundles to a fluid in a mixing apparatus such that the fiber bundles exit the mixing apparatus intact; allowing the binding agent to degrade; and allowing the individual fibers in the fiber bundle to become dispersed throughout the fluid.

The fiber-bundle concentration in the mixing apparatus is preferably lower than about 60. The fibers may comprise linear fibers, curved fibers or both. In addition, the curved fibers may be straightened before being bound by the binding agent, further reducing the crowding factor during mixing. The fluid may be aqueous or non aqueous.

The binding agent may have a melting point higher than the fluid temperature during fiber-bundle addition in the mixing apparatus. Binding-agent degradation may be accomplished by one or more of the following triggers: hydrolysis, dissolution, pH change, oxidizers, reducing agents, pressure, electricity, electromagnetic fields, acoustic waves and neutrons. It is also possible to use a wetting agent in the binding solution in order to improve the binding efficiency of the binding agent.

Binding agents are commonly used in other industries, e.g. textile or paper industries. In the textile industry, the warp yarns are impregnated with a chemical sizing helping the weaving process. Polyvinyl alcohol and derivatives are know to the skilled person even when potentially used with a wetting additive (Tubbs, R. K., "Polyvinyl alcohol copolymers in textile sizing", in *Polyvinyl alcohol*, Ed. By C. A Finch, 1992, John Wiley & Sons Ltd).

In another aspect, embodiments relate to methods for preparing bundles of curved fibers, thereby improving bulk handling and reducing the crowding factor during mixing. The method comprises choosing at least two curved fibers bending the curved fibers such that they are linear placing the straightened fibers together such that they are longitudinally parallel; and affixing the straightened fibers with a binding agent. After the fiber bundles exit the mixing apparatus, and the binding agent degrades, the freed individual fibers may revert to being curved. The curved fibers might be naturally curved or preferably curved as disclosed in the co-pending European patent application no. 09290761.7 and European patent application no. 09290762.5.

In yet another aspect, embodiments relate to suspensions comprising a carrier fluid and fibers. The fibers are initially present in bundles comprising at least two fibers. The fiber-bundle concentration is sufficiently low to maintain a crowding factor below about 60. However, when the fiber bundles degrade and release the individual fibers, the crowding factor in the suspension is above about 60. The carrier fluid may be aqueous or non-aqueous.

For all embodiments, the binding agent may comprise one or more members of the following list: paraffin waxes, polyethylene glycol, polylactic acid, polyester, hydroxyethylcellulose, ethylcellulose, hydroxypropylcellulose, polyvinylalcohol, polyvinylacetate, carboxymethylhydroxyethylcellulose, polyvinylidene chloride, acrylic polymers, starch, casein and animal glue and mixtures thereof. The molecular weight of the polyethylene glycol is preferably between about 1000 and 5000. In addition, for all embodiments, the fiber length may be between about 5 mm and 50 mm, and the fiber diameter may be up to about 300 micrometers.

The fibers in all embodiments may comprise one or more members of the list comprising: silicate glass, acrylonitrile butadiene styrene, cellulose acetate, cycloolefin copolymer, ethylene-vinyl acetate, ethylene-vinyl alcohol, acrylic/PVC alloy, polyacetal, polyacrylate, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexone dimethylene terepthlalate, polycarbonate, polyhydroxyalkanoate, polyketone, polyester, polyethylene, polyetheretherketoneketone, polyetherimide, polyethersulfone, polyethylenechlorinate, polyimide, polylactic acid, polymethylpentene, polyolefins, polyphenylene oxide, polyphenylene sulfide, polyphtalamide, polypropylene, polystyrene, polysulfone, polytrimethylene terephthalate, polyurethane, polyvinyl acetate, polyvinyl chloride and styrene-acrylonitrile.

From Eq. 1 it is clear that, if fibers are bound together to form bundles, the crowding factor will decrease—eventually below the critical crowding factor. For example, for a suspension comprising 1% by volume of cylindrical fibers having a diameter of 180 micrometers and a length of 20 mm. The crowding factor ($N_1$) is in this case 82.

Figure 2:
FIG. 2 is an illustration of a fiber bundle containing 7 fibers, with outside diameter $3d$.

In another example, with similar fibers but that are now bound hexagonally to form bundles. The volume fraction of the bundles is slightly higher by a factor of 9/7 (including the voids between the cylindrical fibers) and the diameter increases by a factor of 3 (FIG. 2): 3×80=540 micrometers in diameter and 20 mm long. The bundle formed here contains seven fibers; therefore, the crowding factor becomes $N_2=N_1/7=11.7$. Thus, the suspension of bound fibers behaves like a dilute suspension.

In other words, for the same concentration of similar fibers, when the fibers are added as individual fibers, the suspension is not pumpable or difficult to pump whereas when added as bundles, the suspension behaves as a dilute suspension and can thus be pumped.

Figure 3:
FIG. 3 is an illustration of a curved fiber.

Further, for situations in which the fibers are naturally curved (FIG. 3), various studies have shown that a suspension containing curved fibers enters the semi-concentrated regime at a significantly lower fiber concentration. In other words, the critical crowding number decreases when the fibers are not linear. This increases the difficulty of using curved fibers for practical well-service-fluid applications. In addition, the handling of dry curled or bent fibers is difficult for at least two reasons: (1) their bulk volume is higher compared to linear fibers; and (2) the fibers tend to become entangled when packaged. Like their linear counterparts, forming bundles of curved fibers would reduce the critical crowding factor.

To illustrate the present embodiments, one may compare by putting the same mass of bound fibers, for example, about 0.7 g placed in two identical bottles. The bound fibers are 2 cm long and made of 7 filaments bound together with polyvinyl alcohol. One bottle is used as reference while water is added in the other bottle. After sufficient stirring and time, the binding agent becomes dissolved in water and the individual fibers are released. The pile of fibers will be significantly taller than it was initially, demonstrating their increased entanglement.

EXAMPLES

The present disclosure may be further understood from the following examples.

Example 1

Rigid bundles of polyamide fibers (Dupont Tynex 612 fibers, about 300 microns in diameter) were made by impregnating a set of seven filaments with a solution of polyvinyl alcohol (PVA, Celvol from Celanese Corp.) comprising a few drops of a wetting agent (Tergitol MinFoam 2X, from Dow Chemical). After the PVA dried, the composite filament was cut into 20-mm lengths.

A 10-g/L aqueous suspension of the fiber bundles was prepared. It was observed that the bundles were stable and the suspension behaved like a dilute suspension that would be easily mixable and pumpable using standard field equipment.

After some time the binding agent dissolved releasing the individual fibers. A noticeable viscosity increase was observed.

Example 2

A set of 7 of curled polyamide filaments (300 microns in diameter) was curled by wrapping them around a cylinder and heating them above the softening temperature, about 120 deg. C. Then, the curled filaments were pulled to straighten them, and glued together using the PVA solution described in Example 1. Once the PVA solution was dried, the filaments were cut into 20 mm long pieces The fiber bundles remained linear.

A 10 g/L suspension of the bundles was prepared and heated to 50° C. while stirring the suspension. As the individual fibers were released, they reassumed their initial curved shape.

Example 3

Experiment 1 is repeated using a different binding agent, composed of a PVA-polyvinyl acetate copolymer (Elvanol T25 from Dupont de Nemours). It is observed that the binding agent is more effective, since it requires more severe conditions (longer time or higher temperature) to free individual fibers.

The invention claimed is:

1. A method for dispersing fibers in a fluid, comprising:

i. forming fiber bundles by affixing at least two fibers with a binding agent;

ii. adding the fiber bundles to the fluid in a mixing apparatus, wherein the fiber bundles exit the mixing apparatus intact;

iii. allowing the binding agent to degrade; and v. allowing the individual fibers in the fiber bundles to become dispersed throughout the fluid;

wherein the fiber bundles are present in the mixing apparatus at a crowding factor lower than about 60 and, after exiting the mixing apparatus, the individual fibers are present at a crowding factor higher than about 60.

2. The method of claim 1, wherein the fibers comprise linear fibers, curved fibers or both.

3. The method of claim 2, wherein the curved fibers are straightened before being bound by the binding agent.

4. The method of claim 1, wherein the fibers comprise one or more members of the list comprising: silicate glass, acrylonitrile butadiene styrene, cellulose acetate, cycloolefin copolymer, ethylene-vinyl acetate, ethylene-vinyl alcohol, acrylic/PVC alloy, polyacetal, polyacrylate, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexone dimethylene terepthlalate, polycarbonate, polyhydroxyalkanoate, polyketone, polyester, polyethylene, polyetheretherketoneketone, polyetherimide, polyethersulfone, polyethylenechlorinate, polyimide, polylactic acid, polymethylpentene, polyolefins, polyphenylene oxide, polyphenylene sulfide, polyphtalamide, polypropylene, polystyrene, polysulfone, polytrimethylene terephthalate, polyurethane, polyvinyl acetate, polyvinyl chloride and styrene-acrylonitrile.

5. The method of claim 1, wherein the fiber length is between about 5 mm and 50 mm.

6. The method of claim 1, wherein the fiber diameter is up to about 300 micrometers.

7. The method of claim 1, wherein the fluid is aqueous or non-aqueous.

8. The method of claim 1, wherein the binding agent comprises one or more members of the list comprising: paraffin waxes, polyethylene glycol, polylactic acid, polyester, hydroxyethylcellulose, ethylcellulose, hydroxypropylcellulose, polyvinylalcohol, polyvinylacetate, carboxymethylhydroxyethylcellulose, polyvinylidene chloride, acrylic polymers, starch, casein and animal glue and mixtures thereof.

9. The method of claim 8, wherein the molecular weight of the polyethylene glycol is between about 1000 and 5000.

10. The method of claim 1, wherein the melting point of the binding agent is higher than the fluid temperature during fiber-bundle addition in the mixing apparatus.

11. The method of claim 1, wherein the binding-agent degradation results from one or more triggers chosen from the list comprising: hydrolysis, dissolution, pH change, oxidizers, reducing agents, pressure, electricity, electromagnetic fields, acoustic waves and neutrons.

12. A method for preparing bundles of curved fibers, comprising:

i. choosing at least two curved fibers;

ii. bending the curved fibers such that they are straightened and linear;

iii. placing the straightened fibers together, such that they are longitudinally parallel; and iv. affixing the straightened fibers with a binding agent, wherein the straightened fibers revert to curved fibers upon binding-agent degradation.

13. The method of claim 12, wherein the binding agent comprises one or more members of the list comprising: paraffin waxes, polyethylene glycol, polylactic acid, polyester, hydroxyethylcellulose, ethylcellulose, hydroxypropylcellulose, polyvinylalcohol, polyvinylacetate, carboxymethylhydroxyethylcellulose, polyvinylidene chloride, acrylic polymers, starch, casein and animal glue and mixtures thereof.

14. The method of claim 13, wherein the molecular weight of the polyethylene glycol is between about 1000 and 5000.

15. The method of claim 12, wherein the fiber length is between about 5 mm and 50 mm.

16. The method of claim 12, wherein the fiber diameter is up to about 300 micrometers.

17. The method of claim 12, wherein the fibers comprise one or more members of the list comprising: silicate glass, acrylonitrile butadiene styrene, cellulose acetate, cycloolefin copolymer, ethylene-vinyl acetate, ethylene-vinyl alcohol, acrylic/PVC alloy, polyacetal, polyacrylate, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexone dimethylene terepthlalate, polycarbonate, polyhydroxyalkanoate, polyketone, polyester, polyethylene, polyetheretherketoneketone, polyetherimide, polyethersulfone, polyethylenechlorinate, polyimide, polylactic acid, polymethylpentene, polyolefins, polyphenylene oxide, polyphenylene sulfide, polyphtalamide, polypropylene, polystyrene, polysulfone, polytrimethylene terephthalate, polyurethane, polyvinyl acetate, polyvinyl chloride and styrene-acrylonitrile.

18. A suspension comprising a carrier fluid and fibers, wherein:
 (i) the fibers are present as bundles comprising two or more fibers at a crowding factor below about 60; and
 (ii) the fibers originating from the bundles are present as individual fibers at a crowding factor above about 60.

19. The suspension of claim 18, wherein the carrier fluid is aqueous or non-aqueous.

\* \* \* \* \*